United States Patent [19]

Akashi

[11] 4,309,233
[45] Jan. 5, 1982

[54] METHOD OF MANUFACTURING SEPARABLE SLIDE FASTENER

[75] Inventor: Shunji Akashi, Kurobe, Japan

[73] Assignee: Yoshida Kogyo K.K., Tokyo, Japan

[21] Appl. No.: 243,128

[22] Filed: Mar. 12, 1981

Related U.S. Application Data

[63] Continuation of Ser. No. 58,952, Jul. 19, 1979, abandoned.

[30] Foreign Application Priority Data

Jul. 26, 1978 [JP] Japan .................................. 53-91234

[51] Int. Cl.³ ........................ B29D 5/00; A44B 19/24
[52] U.S. Cl. .................................. 156/66; 24/205.11 F; 24/205.11 R; 29/408; 29/410; 156/73.1; 156/73.3; 156/245; 156/251; 156/267; 156/269; 156/273; 156/274
[58] Field of Search ................. 24/205.11 F, 205.11 L, 24/205.11 R; 29/408, 409, 410; 156/66, 73.1, 73.3, 242, 245, 250, 251, 267, 269, 273, 274

[56] References Cited

U.S. PATENT DOCUMENTS

| | | | |
|---|---|---|---|
| Re. 25,935 | 12/1965 | Porepp | 156/66 |
| 3,190,779 | 6/1965 | Porepp | 156/66 |
| 3,340,594 | 9/1967 | Fröhlich et al. | 29/408 |
| 3,365,758 | 1/1968 | Hansen | 24/205.11 |
| 3,377,668 | 4/1968 | Carlile et al. | 24/205.11 |
| 3,510,379 | 5/1970 | Heimberger | 156/221 |
| 3,748,709 | 7/1973 | Potin | 156/66 X |
| 4,190,944 | 3/1980 | Yoshida et al. | 29/408 |
| 4,190,945 | 3/1980 | Yoshida et al. | 29/408 |
| 4,232,431 | 11/1980 | Akashi | 24/205.11 R |
| 4,265,014 | 5/1981 | Yoshida et al. | 156/66 X |

Primary Examiner—Edward C. Kimlin
Assistant Examiner—Robert A. Dawson
Attorney, Agent, or Firm—Bucknam and Archer

[57] ABSTRACT

A pair of continuous fastener stringers are fed intermittently for a distance corresponding to an individual slide fastener length. A strip is placed on one surface of the stringers while the latter are held stationary between intermittent movements. Then, heat and pressure is applied to the stringers at its portion where the strip has been placed upon; to fuse adjacent coupling elements with each other and with a pair of stringer tapes, and the latter with the strip, and to shape the fused coupling elements into a desired configuration. Such shaped coupling elements are cut to provide a separable pin and a retainer pin. Simultaneously with this cutting, the stringers are cut along a line extending transversely of the stringers and passing near the two pins to provide an individual slide fastener length. A retainer is attached to the retainer pin.

4 Claims, 12 Drawing Figures

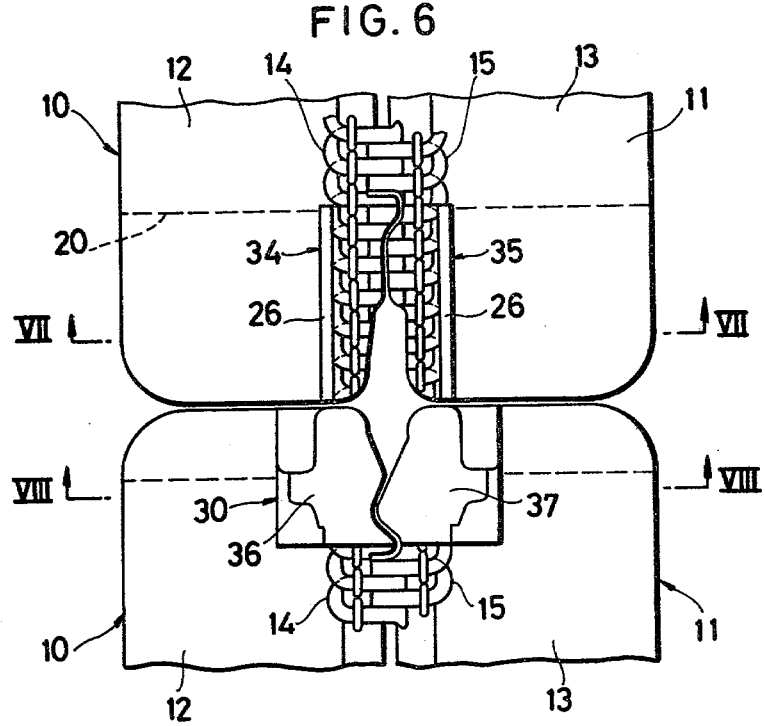
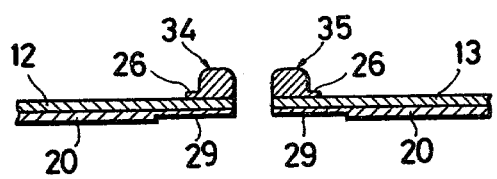
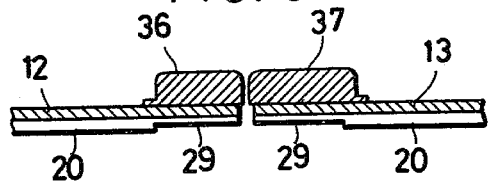

METHOD OF MANUFACTURING SEPARABLE SLIDE FASTENER

This is a continuation, of application Ser. No. 58,952, filed July 19, 1979 and now abandoned.

BACKGROUND OF THE INVENTION

1. Field of the Invention

The present invention relates generally to the production of slide fasteners, and more particularly to a method of manufacturing slide fasteners of a separable type from a pair of fastener stringers of continuous or substantially endless length.

2. Prior Art

There have been proposed many separable slide fasteners equipped with a separable end connector which comprises a separable pin fixed to the bottom end of one of opposed fastener stringers, a retainer pin fixed to the bottom end of the other stringer, and a retainer attached to the retainer pin for receiving the separable pin to connect the two fastener stringers at their bottom ends. In the case of known separable fasteners, each of the separable pin and the retainer pin is formed usually with use of a separate piece of material from the material which constitutes the fastener stringers per se. Such process is complicated and time-consuming.

SUMMARY OF THE INVENTION

It is therefore an object of the present invention to provide a method of manufacturing a separable type of slide fastener with maximum ease and minimum cost.

According to the invention, there is provided a method a manufacturing individual slide fasteners of a separable type from a pair of continuous slide fastener stringers having a pair of stringer tapes carrying along their respective inner longitudinal edges a pair of interengaged rows of coupling elements. The continuous slide fastener stringers are fed intermittently for a distance corresponding to a desired fastener length. A backing strip of synthetic resin is placed on one surface of the stringer tapes while the stringers are held stationary between each intermittent movement, the strip extending transversely of the stringers. Then, heat and pressure is applied to the stringers at its first portion where the strip has been placed upon; to fuse adjacent coupling elements with each other, the coupling elements with the stringer tapes, and the latter with the strip, and to shape the fused coupling elements into a desired configuration ready for the formation of a separable pin and a retainer pin. The separable pin and the retainer pin are finished by cutting such fused and shaped coupling elements. Simultaneously with the finishing of the separable pin and the retainer pin, the stringers are cut along a line extending transversely across the stringers and passing near one ends of the two pins, whereby the continuous slide fastener stringers are severed into an individual slide fastener length. A slider is threaded through one of the stringers of the individual fastener length on which the retainer pin has been formed. Finally, a retainer is attached to the retainer pin.

These and other objects, features and advantages of the present invention will become apparent from the following description when taken in conjunction with the accompanying drawings.

BRIEF DESCRIPTION OF THE DRAWINGS

FIG. 6 is a fragmentary plan view of the stringers, showing the same after the cutting operation has been completed;

FIG. 7 is a cross-sectional view taken along line VII—VII of FIG. 6;

FIG. 8 is a cross-sectional view taken along line VIII—VIII of FIG. 6;

DETAILED DESCRIPTION

Figure 1:
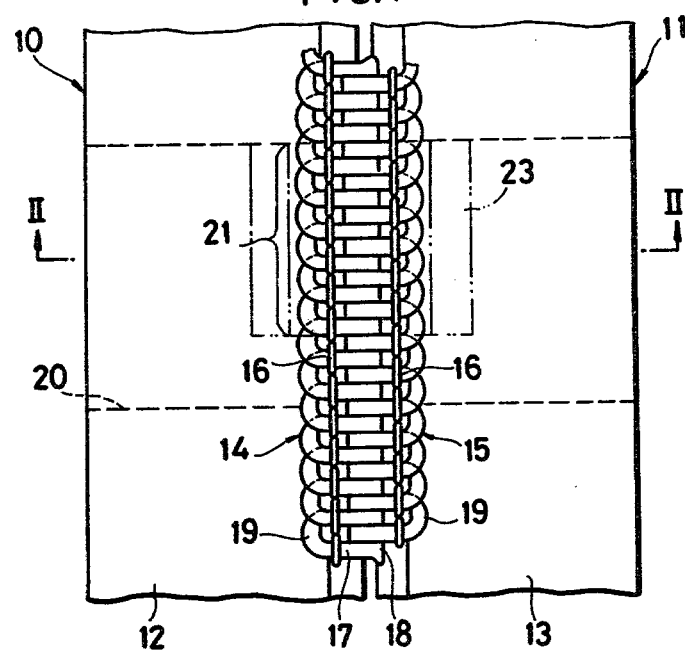
FIG. 1 is a fragmentary plan view of a pair of continuous fastener stringers from which individual slide fasteners of a separable type are manufactured according to the present invention.

In FIG. 1, there is fragmentarily shown a pair of slide fastener stringers 10,11 of continuous length which comprise a pair of stringer tapes 12,13 carrying a pair of interengaged rows of coupling elements 14,15, respectively. Each coupling element 14,15 is sewn to one of stringer tapes 12,13 along its inner longitudinal edge by a sewing thread 16 made of synthetic fibers such as polyester fibers or yarns blended therewith. Each row of coupling elements 14,15 is formed from a continuous filament of a thermoplastic synthetic resin into a helical coil structure including a plurality of turns spaced longitudinally of the tape. Each of the turns includes a pair of spaced legs 17, and a coupling head 18 extending between the legs 17. Each coupling element row 14,15 has a plurality of connecting portions 19 each extending between adjacent turns. Although the coupling elements 14,15 are herein shown to be helically coiled, they may be of a meandering or zigzag formation.

Individual slide fastener products 38 (FIG. 10) are manufactured from the above-described continuous fastener stringers 10,11 in the following manner.

First, a backing strip 20 made of a synthetic resin such as polyester is attached onto the reverse surface of the fastener stringers 10,11 by adhesive-bonding, as shown in FIG. 1. The backing strip 20 extends transversely across the fastener stringers 10,11.

Figure 2:
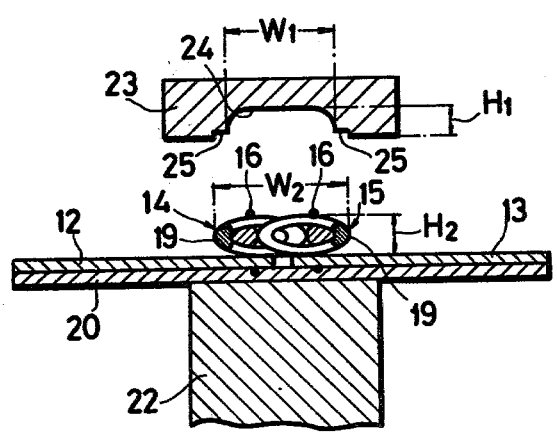
FIG. 2 is a cross-sectional view taken along line II—II of FIG. 1, illustrating the manner in which the stringers are fused and compressed.
Figure 3:
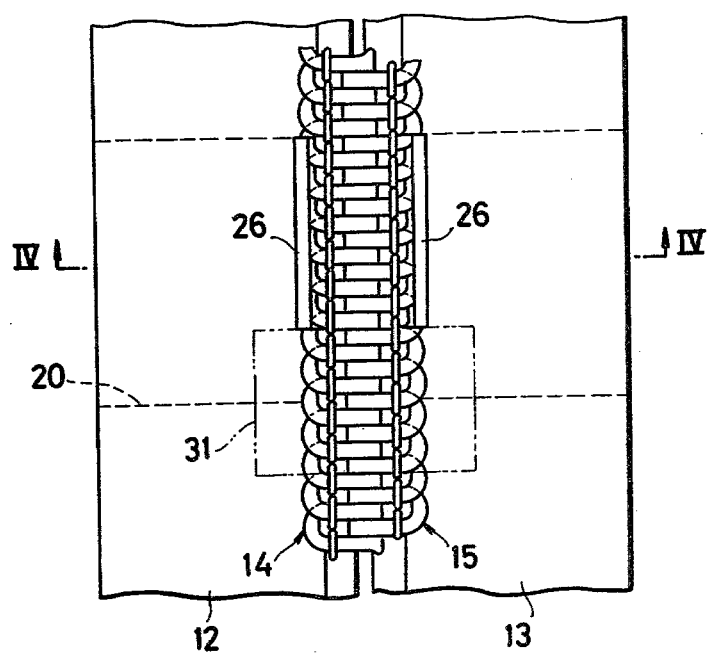
FIG. 3 is a fragmentary plan view of the stringers, showing the same after the fusing and compressin operation has been completed.
Figure 4:
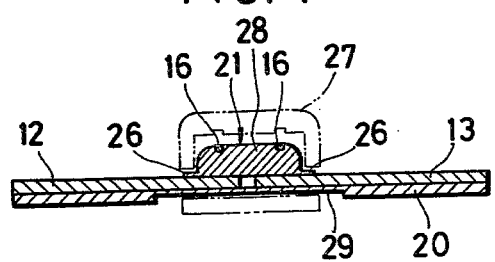
FIG. 4 is a cross-sectional view taken along line IV—IV of FIG. 3.

Then, the interengaged rows of coupling elements 14,15 are shaped or deformed with heat and pressure at a first portion 21 (FIG. 1) thereof into the shape shown in FIGS. 3 and 4. This deformation is effected by means of an ultrasonic horn 22 and an anvil 23 which are designed to jointly compress the fastener stringers 10,11 and the backing strip 20 in a sandwich manner, as shown in FIG. 2. At that time, the anvil 23 and the ultrasonic horn 22 are brought into pressed contact with the front surface of the fastener stringers 10,11 and the reverse surface of the strip 20, respectively.

The anvil 23 includes a mold cavity 24 having a length equal to a predetermined amount of leg-to-leg pitches (nearly six pitches in the illustrated example) of the coupling elements 14,15, a depth $H_1$ slightly smaller than the height $H_2$ of the coupling elements 13,15, and a width $W_1$ slightly smaller than the width $W_2$ of the interengaged rows of coupling elements 14,15. The anvil 23 is further provided with a pair of recesses 25,25 coextending with the cavity 24 along its opposite longitudinal edges. Accordingly, when the anvil 23 is lowered to compress the coupling elements 14,15, the connecting portions 19,19 of the latter are pressed by the recesses 25,25 of the anvil 23 and are thus shaped into a pair of minor-thickness edge portions 26,26. The minor-thickness edge portions 26,26 each have a flat surface so that a slider 27 (FIG. 4) can be moved thereon smoothly. Extending between the two edge portions 26,26 is a major-thickness central portion 28 of which contour conforms substantially to that of the cavity 24.

Simultaneously as the coupling elements 14,15 are deformed from the shape of FIGS. 1 and 2 into that of FIGS. 3 and 4, the backing strip 20 is fused and compressed by the ultrasonic horn 22 with the results that the strip 20 is reduced in thickness as at 29 (FIG. 4). Because the strip 20 can be attached to the fastener stringers 10,11 solely by this fusion-bonding, the aforementioned adhesive-bonding step may be omitted.

As best shown in FIG. 4, the coupling elements 14,15 in the deformed first portion 21 are fused with each other as well as with the stringer tapes 12,13 which in turn are fused with the backing strip 20. The sewing threads 16 also are fused with the coupling elements 14,15 and are thus prevented from becoming loose. The extent to which the coupling elements 14,15 are deformed may be only appreciable and may be hardly observed when viewed in projection as shown in FIG. 3. They may be deformed in part or whole, as the case may be.

Figure 5:
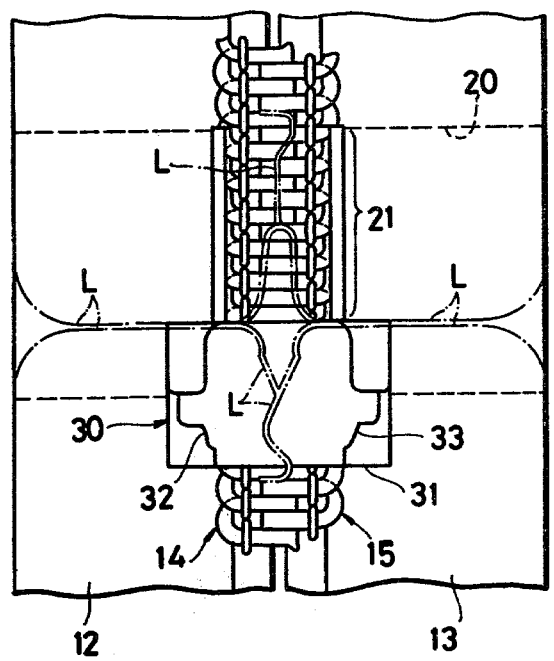
FIG. 5 is a fragmentary plan view of the stringers, illustrating the manner in which the stringers are cut to form a separable pin, a retainer pin, and a top end stop, respectively.

Subsequently, a top end stop 30 (FIG. 5) is formed on the fastener stringers 10,11. As shown in FIG. 3, a film or strip 31 made of a synthetic resin is first placed on the fastener stringers 10,11 such that it extends across the interengaged coupling element rows 14,15, overlying a group of coupling element turns adjacent the rear end of the deformed first portion 21. Then, pressure and heat is applied by means of an ultrasonic horn and an anvil (both not shown) to the film 31 for simultaneously fusing the film 31 with the stringer tapes 12,13 and the said group of turns of coupling elements 14,15 and shaping a pair of outer edges 32,33 of the top end stop 30 into a desired form. Thus, the top end stop 30 is formed at a position adjacent the rear end of the deformed first portion 21. Alternatively, the top end stop 30 may be formed at a location away from the deformed first position 21.

Then, the fastener stringers 10,11 are cut along dash-and-dot lines L (FIG. 5) to provide a separable pin 34, a retainer pin 35, and a pair of opposed top end stop lugs 36,37, respectively, as shown in FIG. 6. This cutting operation is effected by a suitable punch with heat generated as by an ultrasonic horn (not shown).

With the continuous slide fastener stringers 10,11 fed intermittently for a distance corresponding to a desired fastener length, all of the preceding steps are carried out while the stringers 10,11 are held stationary between each intermittent movement. Thus, a plurality of pairs of fastener stringers of the individual fastener length have been obtained, each pair of fastener stringers 10,11 being furnished at its top end with the separable top end stop 30 and at its bottom end with the separable pin 34 and the retainer pin 35.

Figure 9:
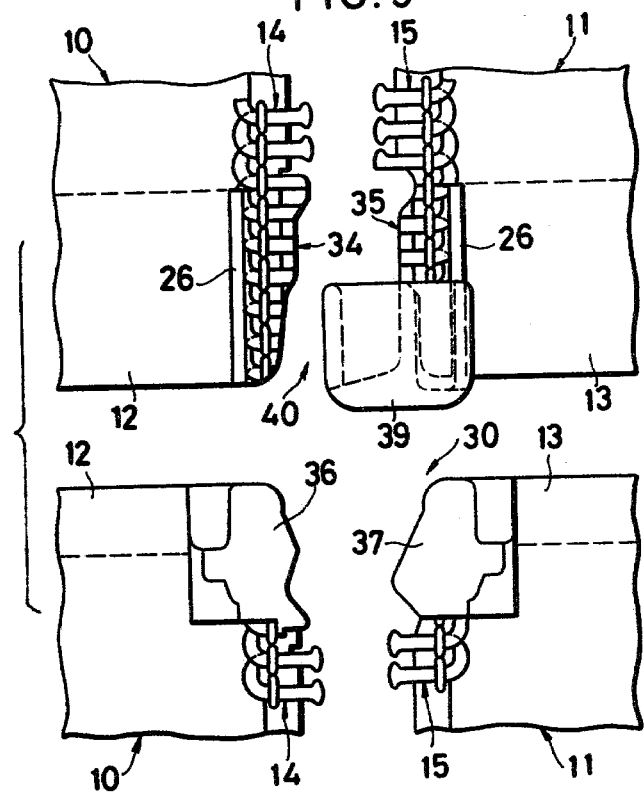
FIG. 9 is a fragmentary plan view of the stringers, showing the same after a box like retainer has been attached to the retainer pin.
Figure 10:
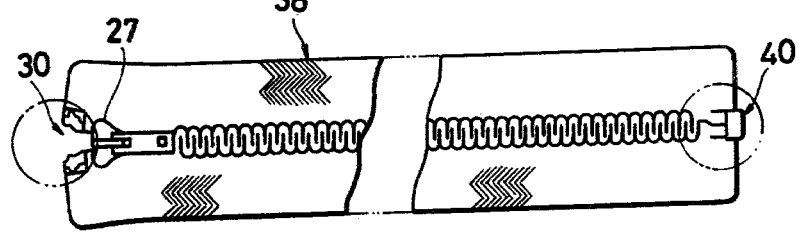
FIG. 10 is a schematic plan view of a separable slide fastener manufactured according to the present invention.
Figure 11:
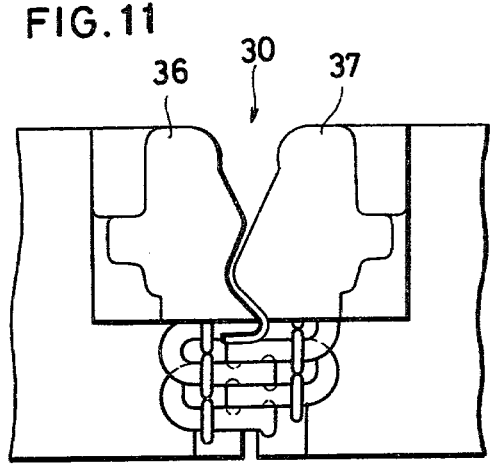
FIG. 11 is an enlarged plan view of a top end stop of the separable slide fastener shown in FIG. 10.
Figure 12:
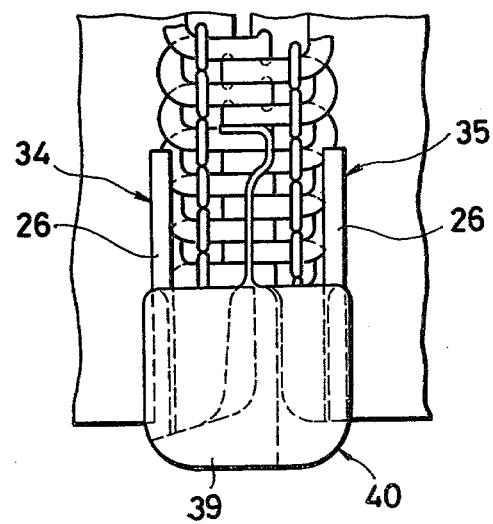
FIG. 12 is an enlarged plan view of a separable end connector of the separable slide fastener shown in FIG. 10.

In the manufacture of each slide fastener product 38 (FIG. 10), the opposed fastener stringers 10,11 are separated apart from each other, and a slider 27 is then threaded through the fastener stringer 11 on which the retainer pin 35 has been formed. Finally, a box-like retainer 39 is secured to the retainer pin 35 by fusion-bonding, adhesive-bonding or other suitable means, as shown in FIG. 9. The separable pin 34, the retainer pin 35 and this box-like retainer 39 jointly constitute a separable end connector 40. In this manner, a plurality of individual slide fastener products 38, only one of which is shown in FIGS. 10 through 12, are manufactured.

Although preferred embodiments have been described and illustrated, it should be understood that changes and modifications may be made herein without departing from the scope of the appended claims.

What is claimed is:

1. A method of manufacturing individual slide fasteners of a separable type from a pair of continuous slide fastener stringers having a pair of stringer tapes carrying on one surface thereof a pair of interengaged rows of coupling elements along their opposed longitudinal edges, comprising the steps of:
  (a) feeding the continuous slide fastener stringers intermittently for a distance corresponding to a desired fastener length;
  (b) placing a backing strip of synthetic resin only on the other surface of the stringer tapes on which no coupling elements are carried while the stringers are held stationary between each intermittent movement, said strip extending transversely of the stringers at a first portion thereof;
  (c) placing a film of synthetic resin on said one surface of the stringer tapes on which the coupling elements are carried such that the film extends across and over a group of coupling elements at a second portion of the stringers adjacent to said first portion;
  (d) applying heat and pressure to the stringers at said first portion to fuse adjacent coupling elements with each other, the coupling elements with the stringer tapes on said one surface, and the latter with the strip on said other surface, and to shape the fused coupling elements under pressure into a predetermined configuration including a pair of reduced-thickness edge portions transversely spaced from each other and a major central portion disposed between said edge portions and in alignment with the interengaged rows of coupling elements, ready for the formation of a separable pin and a retainer pin, and at said second portion to fuse adjacent coupling elements with each other, the coupling elements with the stringer tapes, and the film with the coupling elements and the stringer tapes, and to shape the fused coupling elements and the film into a predetermined configuration ready for the formation of a pair of top end stop lugs;

(e) cutting such fused and shaped coupling elements at said first portion so as to bisect said major central portion into the separable pin and the retainer pin, and at said second portion so as to finish the top end stop lugs;

(f) simultaneously with said cutting step (e), cutting the stringers along a line extending transversely across the stringers and passing near one end of the two pins, whereby said continuous slide fastener stringers are severed into an individual slide fastener length;

(g) threading a slider through one of the stringers of said individual fastener length on which the retainer pin has been formed; and (h) attaching a retainer to the retainer pin.

2. A method according to claim 1, wherein said strip is attached to said one surface of the stringers by adhesive-bonding.

3. A method according to claim 1, wherein said step of applying heat and pressure is carried out by an ultrasonic horn and an anvil.

4. A method according to claim 1, wherein said step of cutting the fused coupling elements and the stringers is carried out by a punch and an ultrasonic horn.

* * * * *